United States Patent [19]

Kern et al.

[11] Patent Number: 5,053,477

[45] Date of Patent: Oct. 1, 1991

[54] PROCESS FOR THE PRODUCTION OF AROMATIC POLYETHER KETONES

[75] Inventors: Sabine Kern, Moers; Joachim Genz, Krefeld; Frank Kleiner, Leverkusen; Volker Eckhardt; Karsten J. Idel, both of Krefeld, all of Fed. Rep. of Germany

[73] Assignee: Bayer Aktiengesellschaft, Leverkusen-Bayerwerk, Fed. Rep. of Germany

[21] Appl. No.: 484,935

[22] Filed: Feb. 26, 1990

[30] Foreign Application Priority Data

Mar. 8, 1989 [DE] Fed. Rep. of Germany ....... 3907474

[51] Int. Cl.[5] ...................... C08G 8/02; C08G 14/00; C08G 65/34
[52] U.S. Cl. .................................... 528/125; 528/126; 528/128; 528/174; 528/175; 528/176; 528/196; 528/206
[58] Field of Search ............... 528/125, 126, 128, 174, 528/175, 176, 196, 206

[56] References Cited

U.S. PATENT DOCUMENTS

| 4,661,581 | 4/1987 | Nozawa et al. | 528/176 |
| 4,703,102 | 9/1987 | Fukuoka et al. | 528/206 |
| 4,804,735 | 2/1989 | Fukawa et al. | 528/125 |
| 4,954,604 | 9/1990 | Genz et al. | 528/125 |

*Primary Examiner*—John Kight, III
*Assistant Examiner*—Kathryne E. Shelborne
*Attorney, Agent, or Firm*—Connolly and Hutz

[57] ABSTRACT

The present invention relates to a process for the production of high molecular weight crystalline aromatic polyether ketones from an aromatic dihydroxy compound and an aromatic dihalogeno compound which contains a keto group, characterized in that N-C1-C5 alkyl caprolactam solvents and a mixture of alkali metal compounds consisting of at least one alkali metal carbonate and at least one compound selected from alkali metal hydroxides, bicarbonates, fluorides, hydrides, alkoxides (e.g. methylates or ethylates) and alkylates (e.g. ethyls or butyls) are used.

4 Claims, No Drawings

PROCESS FOR THE PRODUCTION OF AROMATIC POLYETHER KETONES

This invention relates to a process for the production of crystalline aromatic polyether ketones having a high molecular weight, a high heat stability, a high resistance to the action of chemicals and good mechanical properties.

Crystalline aromatic polyether ketones are known. They may be produced, e.g., by reaction of a dialkali metal salt of a bisphenol, which optionally contains a keto group, with a dihalogeno compound in the presence of an aromatic sulphone at from 250° to 400° C. (U.S. Pat No. 4,010,147). Another process is based on the reaction of a halogenophenol containing keto groups with an alkali metal carbonate in N-methylpyrrolidone, an aliphatic sulphone or an aromatic sulphone at from 200° to 400° C. (e.g. U.S. Pat. No. 4,113,699).

In order to prepare high molecular weight crystalline aromatic polyether ketones, it is necessary to use a solvent, although the crystalline polyether ketones produced are very sparingly soluble.

In the production of the polyether ketones, the solvents in which the polymerization is carried out must have certain properties in order to achieve good yields.

Thus, for example, if an aliphatic sulphone is used as a solvent, undesirable gelling of the batch or discoloration is observed during the reaction, since the reaction has to be maintained at very high reaction temperatures for a long time. If, for example, benzophenones are used as the solvents, only oligomers may be obtained (U.S. Pat. No. 4,010,147).

Only certain benzophenones, such as difluorobenzophenone, are employed for the production of polymers (e.g. EP-A 1 879). However, these are very expensive and uneconomic. It has still not yet been possible to polymerize chlorinated compounds in satisfactory yields.

Production of aromatic polyether ketones from dihalogenoaromatics and dihydroxyaromatics in $C_1$–$C_4$ alkyl lactams as solvents in the presence of a base, preferably sodium carbonate, is known from DE-A 2,220,079. The process has the disadvantage, however, that when dichloroketones are used, no sufficiently high molecular weight may be reached in the polymers prepared therefrom.

It has now been found that when N-alkylated caprolactam solvents and certain catalyst mixtures are used for the production of crystalline high molecular weight aromatic polyether ketones, chloroketones may also be used.

The present invention relates to a process for the production of high molecular weight crystalline aromatic polyether ketones from an aromatic dihydroxy compound and an aromatic dihalogeno compound which contains a keto group, characterized in that N—$C_1$—$C_5$ alkyl caprolactam solvents and a mixture of alkali metal compounds consisting of at least one alkali metal carbonate and at least one compound selected from alkali metal hydroxides, bicarbonates, fluorides, hydrides, alkoxides (e.g. methylates or ethylates) and alkylates (e.g. ethyls or butyls) are used.

To prepare the polyether ketones, for example, aromatic dihydroxy compounds having free hydroxyl groups may be reacted with an aromatic dihalogeno-keto compound in an N-alkylated caprolactam in the presence of a mixture of alkali metal compounds (reaction type 1); or monohydroxymonohalogeno compounds having a free hydroxyl group may be reacted in an N-alkylated caprolactam in the presence of a mixture of alkali metal compounds (reaction type 2); or alkali metal salts of aromatic dihydroxy compounds may be reacted with aromatic dihalogeno-keto compounds in the presence of an N-alkylated caprolactam (reaction type 3); or alkali metal salts of a monohydroxymonohalogeno compound may be reacted in an N-alkylated caprolactam (reaction type 4).

Dihydroxy compounds which may be employed for the process according to the present invention are phenols corresponding to the following general formula (I):

HO—Ar—OH         (I)

wherein Ar represents $C_6$–$C_{30}$ arylene.

Suitable aromatic dihydroxy compounds are known, e.g. mononuclear bis-phenols, such as hydroquinone, polynuclear dihydroxy compounds, such as 4,4'-dihydroxydiphenyl, 2,2-bis-(4-hydroxyphenyl)propane, bis-(4-hydroxy-phenyl)methane, 4,4'-dihydroxybenzophenone, 4,4'-dihydroxydiphenyl ether, 4,4'-dihydroxydiphenyl sulphide, 1,4-bis-(4-hydroxybenzoyl)-benzene, 1,3-bis-(4-hydroxybenzoyl)benzene and nuclear-substituted derivatives thereof etc. They may be employed individually or as mixtures.

4,4'-dihydroxydiphenyl, 4,4'-dihydroxydiphenyl ether, hydroquinone and 4,4'-dihydroxybenzophenone are preferably employed.

Aromatic dihalogeno-keto compounds corresponding to the following general formula (II):

X—Ar—X         (II)

wherein
Ar represents $C_6$–$C_{30}$ arylene containing at least one keto group; and
X represents halogen, such as Cl, in the ortho- or para-position on the particular last aromatic nucleus; may be employed for the process according to the present invention.

Preferred dihalogeno-keto compounds may correspond to the following general formulae (III), (IV) or (V):

(III)

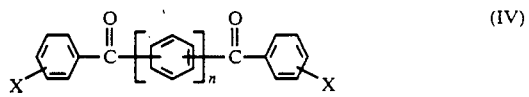

(IV)

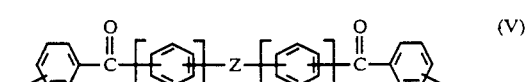

(V)

wherein
X is as defined in connection with general formula (II);
Z represents an ether group, a thioether group, a carbonyl group or a sulphone group; and
m and n represent the numbers 1, 2 or 3.

Aromatic dihalogeno-keto compounds which are suitable according to the present invention are dichloro compounds, for example 4,4'-dichlorobenzophenone, 2,4'-dichlorobenzophenone, bis-1,4-(4-chlorobenzoyl)- benzene, bis-1,3-(4-chlorobenzoyl)benzene, bis-4,4'-(4-chlorobenzoyl)biphenyl and bis-4,4'-(4-chlorobenzoyl)diphenyl ether etc. The dihalogeno-keto compounds may be employed by themselves or as a mixture.

The dihalogeno-keto compounds (II) preferably have a chlorine atom in the para-position on the particular last aromatic nucleus.

Chlorine-substituted aromatic dihalogeno-keto compounds may be produced more easily than the difluoro compounds otherwise used (considerably less expensive) and are adequately reactive under the reaction conditions according to the present invention.

Particularly preferred aromatic dihalogeno-keto compounds are 4,4'-dichlorobenzophenone and bis-1,4-(4-chlorobenzoyl)benzene.

Monohydroxymonohalogeno compounds which are suitable according to the present invention may correspond to the following general formula (VI):

$$X-Ar-OH \qquad (VI)$$

wherein
X represents halogen, such as Cl;
X and OH being in the ortho- or para-position on the particular last aromatic radical; and
Ar is as defined in connection with general formula (II).

Instead of the compounds having free hydroxyl groups, the alkali metal salts (e.g. Li, Na or K salts) of the corresponding compounds may be employed.

Examples of preferred monohydroxymonohalogeno compounds are 4-chloro-4'-hydroxybenzophenone, 4-(4-chlorobenzoyl)-4'-hydroxybiphenyl, 4-(4-chlorobenzoyl)-4'-hydroxydiphenyl, 4-(4-chlorobenzoyl)-4'-hydroxydiphenyl ether, 4-chloro-4'-hydroxyterephthalophenone and 4-chloro-4'-dihydroxyisophthalophenone etc., and alkali metal salts thereof.

The monohydroxymonohalogeno compounds may be employed individually or as mixtures.

The alkali metal salts thereof may be obtained by the customary processes, for example by reaction of the hydroxyl compounds with alkali metal hydroxides, such as LiOH, NaOH or KOH.

The preferred monohydroxymonohalogeno compound is 4-chloro-4'-hydroxybenzophenone or an alkali metal salt thereof (e.g. the Na or K salt).

The solvent which is preferably employed in the process according to the present invention is N-methylcaprolactam, N-ethylcaprolactam, N-n-propylcaprolactam or N-isopropylcaprolactam, in particular N-methylcaprolactam.

The particular advantages of the solvents used according to the present invention reside in that they are liquid at room temperature, have a very high boiling point and are stable to heat and strongly polar.

The solvents used according to the present invention may be employed individually or as mixtures. They may also be employed as a mixture with known solvents, such as diphenyl sulphone or benzophenone.

Base combinations (catalyst mixtures) consisting of at least one alkali metal carbonate (e.g. Li$_2$CO$_3$, Na$_2$CO$_3$ or K$_2$CO$_3$) and at least one alkali metal compound (e.g. Li salt, Na salt or K salt) selected from alkali metal hydroxides, bicarbonates, fluorides, hydrides, C$_1$-C$_{10}$ alkoxides (e.g. methylates or ethylates) and C$_1$-C$_{10}$ alklates (e.g. ethyls or butyls) are suitable according to the present invention.

Mixtures of alkali metal carbonates with alkali metal bicarbonates and hydroxides are preferred, and mixtures of potassium carbonate and potassium bicarbonate are particularly preferred.

The ratio of the amounts of alkali metal carbonate to other alkali metal compound is from 1:99 to 99:1, preferably from 40:60 to 90:10, more preferably from 60:40 to 80:20.

If monohydroxymonohalogeno compounds (VI) are employed as alkali metal salts in the process according to the present invention, the addition of alkali metal carbonate may be omitted if appropriate.

The process according to the present invention may be carried out as follows:

The reaction components are dissolved in the solvent in the presence of the alkali metal compounds and the reaction mixture is gradually heated to from about 120° to 200° C.

Water resulting from the reaction is removed by an entraining agent at this temperature, the azeotropic entraining agent is then distilled off by increasing the temperature, and the mixture is finally heated to reaction temperatures of from 200° to 400° C. and maintained at such a temperature for from 0.1 to 24 hours, preferably from 0.5 to 4 hours. To achieve high molecular weights, the aromatic dihydroxy compounds are reacted with the aromatic dihalogeno-keto compounds in approximately equimolar amounts.

In order to achieve lower molecular weights in a controlled manner as desired, it may be expedient to employ one of the reaction components in excess.

If alkali metal salts have to be added, from 1.0 to 2.0 mol, preferably from 1.0 to 1.5 mol, more preferably from 1.21 to 1.4 mol, of alkali metal salts are added per equivalent of hydroxyl groups.

Azeotropic entraining agents which may be employed are compounds which form an azeotrope with water and preferably have a lower boiling point than the solvent used according to the present invention, for example benzene, toluene and zylene etc., preferably toluene.

According to the present invention, the reaction is carried out at a temperature of from 180° to 400° C., preferably from 200° to 280° C.

Crystalline aromatic polyether ketones having high molecular weights of from 1,000 to 500,000 (M$_w$) and a relative viscosity of from 1.5 to 4.5 (measured in sulphuric acid in a concentration of 1 g/100 ml) are obtained according to the present invention.

The relative viscosity may be calculated according to the formula:

$$\eta_{rel} = \frac{\eta}{\eta_o}$$

wherein
$\eta_o$ denotes the viscosity of the solvent used,
$\eta$ denotes the viscosity of the polymer solution; and
$\eta_{rel}$ denotes the relative viscosity.

The highly crystalline aromatic polyether ketones which have been produced by the present process are insoluble in the customary solvents and have an excellent heat stability and resistance to chemicals and excellent mechanical properties. They may be used for the production of shaped articles, films, fibres, surface coatings etc. They may be blended and processed with other polymers, and blended with the customary fillers, such as glass fibres, carbon fibres, aramid fibres, calcium carbonate and calcium silicate, and customary additives, such as stabilizers, pigments, mould release agents etc.

EXAMPLES

General process instructions

EXAMPLES 1-4 (REACTION TYPE 1)

1.0 mol 4,4'-dichlorobenzophenone, 1.0 mol aromatic dihydroxy compound, 1,200 ml N-methylcaprolactam, 360 ml toluene, 1.0 mol $K_2CO_3$ and 0.3 mol $KHCO_3$ are introduced into a 3,000 ml three-necked round-bottomed flask having a glass stirrer and a water separator and equipped with a reflux condenser and thermometer. The reaction mixture is heated while stirring, until the water resulting from the reaction has been removed completely, after from 1 to 5 hours, at an internal temperature of 200° C. After removal of the water resulting from the reaction, the mixture is heated to about 230° C. and stirring is continued for about 9 hours.

To coagulate the polymer formed, the still-hot reaction mixture is precipitated in a 10% aqueous phosphoric acid solution and the polymer, which has precipitated in powder form, is then filtered off and suspended several times in water until it is free from electrolytes. To remove any residual amounts of solvent present, the product is then boiled with methanol, filtered and dried. The yield is more than 93% of the theoretical value.

COMPARISON EXAMPLE 1

The procedure is analogous to Example 1, but 1.3 mol $Na_2CO_3$ are employed as the base.

The relative viscosity of the dried product is determined in 100% sulphuric acid in a concentration of 1 g/100 ml: $_{rel}$=1.328.

EXAMPLE 5 (REACTION TYPE 2)

2.0 mol aromatic monohydroxymonohalogenoketo compound, 1,200 ml N-methyl-caprolactam, 360 ml toluene, 1.0 mol $K_2CO_3$ and 0.3 mol $KHCO_3$ are introduced into a 3,000 ml three-necked round-bottomed flask provided with a glass stirrer, water separator with reflux condenser and thermometer. The reaction process proceeds analogously to reaction type 1.

EXAMPLES 6 AND 7 (REACTION TYPES 3 AND 4)

Instead of the reaction components of reaction types 1 and 2, the corresponding alkali metal salts (potassium phenolates and additional 0,3 moles $KHCO_3$) are introduced into a vessel instead of the compounds having free hydroxyl groups, and the process is analogous to that described under reaction type 1.

The polymers produced are summarized in Table 1.

TABLE 1

| Example no. | Reaction components | Polymer structure formed | Rel. viscosity | Melting point °C. | Fusion enthalpy J/kg | Colour of the product |
|---|---|---|---|---|---|---|
| 1 | 4,4'-dichlorobenzophenone hydroquinone | | 2.45 | 338 | 67 | pale beige |
| 2 | 4,4'-dichlorobenzophenone 4,4'-dihydroxydiphenyl | | 1.509 | 391 | 109 | beige |
| 3 | 4,4'-dichlorobenzophenone 4,4'-dihydroxydiphenyl ether | | 2.06 | 324 | 67 | ochre yellow |
| 4 | 4,4'-dichlorobenzophenone 4,4'-dihydroxybenzophenone | | 1.532 | 375 | 113 | white |
| 5 | 4-chloro-4'-hydroxy-benzophenone | | 1.924 | 365 | 114 | yellow |
| 6 | 4-chloro-4'-hydroxy-benzophenone potassium salt | | 2.281 | 366 | 114 | yellow |
| 7 | 4,4'-dichlorobenzophenone hydroquinone potassium salt | | 1.603 | 340 | 69 | beige |

The relative viscosity of the dried product is determined in 100% sulphuric acid at a concentration of 1 g/100 ml.

The crystallite melting point and the associated fusion enthalpy, as a function of the degree of crystallization, were determined with the aid of a DSC measuring unit from Mettler of the "Mettler TA 3000" type.

We claim:

1. Process for the production of a high molecular weight crystalline aromatic polyether ketone from an aromatic dihydroxy compound and an aromatic dihalogeno compound containing a keto group, characterized in that $N-C_1-C_5$ alkyl-caprolactam solvents and a mixture of alkali metal compounds consisting of at least one alkali metal carbonate and at least one compound selected from alkali metal hydroxides, bicarbonates, fluorides, hydrides, alkoxides and alkylates are used.

2. Process according to claim 1, characterized in that mixtures of potassium carbonate with potassium bicarbonate or hydroxide are used.

3. Process according to claim 1, characterized in that aromatic monohydroxymonohalogeno compounds corresponding to the following general formula (I):

HO—Ar—X  (I)

wherein

X represents halogen, such as chlorine; and

X and OH are in the ortho- or para-position on the particular last aromatic radical; are employed.

4. Process according to claim 1, characterized in that aromatic dihalogeno compounds corresponding to the following general formula (II)

X—Ar—X  (II)

wherein

Ar represents $C_6$–$C_{30}$ arylene containing at least one keto group; and

X represents Cl in the ortho- or para-position on the particular last aromatic radical; are employed.

* * * * *